(12) United States Patent
Tsukasaki et al.

(10) Patent No.: US 7,797,093 B2
(45) Date of Patent: Sep. 14, 2010

(54) WHEEL GROUND-CONTACT STATE JUDGING DEVICE AND METHOD

(75) Inventors: Yuichiro Tsukasaki, Tokyo (JP); Masaru Kogure, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 974 days.

(21) Appl. No.: 11/177,286

(22) Filed: Jul. 11, 2005

(65) Prior Publication Data

US 2006/0006017 A1    Jan. 12, 2006

(30) Foreign Application Priority Data

Jul. 12, 2004    (JP)    ............................. 2004-204570

(51) Int. Cl.
*G06F 19/00* (2006.01)
*G06F 17/00* (2006.01)
*G06G 7/00* (2006.01)
*G06G 7/76* (2006.01)
*B60D 1/28* (2006.01)
*B60K 28/00* (2006.01)
*B60K 28/12* (2006.01)
*B60K 28/14* (2006.01)
*B60L 3/00* (2006.01)
*B60R 21/00* (2006.01)
*B62D 49/08* (2006.01)

(52) U.S. Cl. .............................. 701/70; 701/1; 701/36; 701/37; 701/38; 180/271; 180/282

(58) Field of Classification Search ................... 701/70, 701/1, 29, 36, 37, 38; 180/197, 282, 271, 180/446; 280/5.5, 5.501, 5.502, 5.504, 5.505, 280/5.506, 5.507; 340/438, 439, 440, 442; 702/33, 41, 42, 43, 44, 141; 73/146, 510, 73/509, 117.03, 115.07, 115.05

See application file for complete search history.

(56) References Cited

U.S. PATENT DOCUMENTS 5,186,042 A    2/1993    Miyazaki (Continued)

FOREIGN PATENT DOCUMENTS

JP    4-331336    11/1992

(Continued)

OTHER PUBLICATIONS

U.S. Appl. No. 11/135,433, filed May 24, 2005, entitled Estimating Device and Vehicle Motion Control Device Using the Same.

*Primary Examiner*—Khoi Tran
*Assistant Examiner*—Nicholas Kiswanto
(74) *Attorney, Agent, or Firm*—Smith, Gambrell & Russell, LLP

(57) ABSTRACT

In wheel ground-contact state judging device and method, a detector directly detects a lateral force acting in a direction perpendicular to the wheel center plane of a wheel. An acceleration sensor detects an acceleration in the lateral direction of a vehicle. A calculator calculates a cornering force acting on each wheel on the basis of the acceleration in the lateral direction thus detected. A judging unit compares the detected lateral force with the calculated cornering force to judge whether the ground-contact state of the wheel is good or not.

10 Claims, 4 Drawing Sheets

U.S. PATENT DOCUMENTS

| | | |
|---|---|---|
| 5,222,471 A | 6/1993 | Steuven |
| 5,742,919 A * | 4/1998 | Ashrafi et al. ............... 701/70 |
| 6,032,520 A | 3/2000 | Miyazaki |
| 6,035,251 A * | 3/2000 | Hac et al. .................. 701/70 |
| 6,138,505 A | 10/2000 | Miyazaki |
| 6,161,905 A * | 12/2000 | Hac et al. .................. 303/146 |
| 6,208,920 B1 * | 3/2001 | Izawa et al. ................ 701/36 |
| 6,304,805 B1 | 10/2001 | Onogi |
| 6,356,188 B1 * | 3/2002 | Meyers et al. ............. 340/440 |
| 6,508,102 B1 * | 1/2003 | Margolis et al. ............... 73/8 |
| 6,651,518 B1 | 11/2003 | Miyazaki |
| 6,658,342 B1 * | 12/2003 | Hac ........................... 701/70 |
| 6,662,898 B1 * | 12/2003 | Mattson et al. ............ 180/446 |
| 6,804,584 B2 * | 10/2004 | Tseng et al. .................. 701/1 |
| 7,165,644 B2 * | 1/2007 | Offerle et al. ............. 180/244 |
| 2002/0056582 A1 * | 5/2002 | Chubb et al. .............. 180/197 |
| 2002/0128760 A1 * | 9/2002 | Bodie et al. ................. 701/37 |
| 2002/0143451 A1 * | 10/2002 | Hac et al. ................... 701/48 |
| 2003/0236606 A1 * | 12/2003 | Lu et al. ...................... 701/70 |
| 2004/0041358 A1 * | 3/2004 | Hrovat et al. ........... 280/5.502 |
| 2004/0128044 A1 * | 7/2004 | Hac ............................. 701/48 |
| 2005/0012501 A1 | 1/2005 | Isono |
| 2005/0057095 A1 * | 3/2005 | Hac ........................... 303/122 |
| 2005/0080546 A1 * | 4/2005 | Milot .......................... 701/70 |
| 2005/0206229 A1 * | 9/2005 | Lu et al. .................... 303/123 |
| 2008/0120005 A1 * | 5/2008 | Lu et al. ...................... 701/70 |

FOREIGN PATENT DOCUMENTS

| | | |
|---|---|---|
| JP | 10-264636 | 10/1998 |
| JP | 10-318862 | 12/1998 |
| JP | 2001-050973 | 2/2001 |
| JP | 2002-012141 | 1/2002 |
| JP | 2002-22579 | 1/2002 |
| JP | 2002-039744 | 2/2002 |
| JP | 2002-347424 | 12/2002 |
| JP | 2003-104139 | 4/2003 |

* cited by examiner

VERTICAL FORCE
(GROUNDED-CONTACT LOAD) Fz

WHEEL CENTER PLANE

DIRECTION OF WHEEL CENTER PLANE

LONGITUDINAL FORCE Fx

LATERAL FORCE Fy

SLIP ANGLE

TRAVEL DIRECTION OF TIRE GROUND-CONTACT CENTER

AXLE ROTATIONAL AXIS

WHEEL CENTER PLANE

Fz

Fy

WHEEL CENTER PLANE

T

Fz

Fy

Y

WHEEL GROUND-CONTACT STATE JUDGING DEVICE AND METHOD

CROSS REFERENCE TO RELATED APPLICATIONS

The disclosure of Japanese Application No. 2004-204570 filed on Jul. 12, 2004 including the specification, drawings and abstract is incorporated herein by reference in its entirety.

BACKGROUND OF THE INVENTION

1. Field of the Invention

The present invention relates to a device and a method for judging a wheel ground-contact state, and a vehicle motion control device.

2. Description of the Related Art

There is known a method of controlling a vehicle motion state in consideration of a ground contact state of wheel from the viewpoint of enhancing safety of a vehicle when the vehicle is turning. According to this control method, it is required to monitor the ground-contact state of the wheel, and thus the ground-contact state is estimated on the basis of a roll angle occurring in the vehicle or a roll angular velocity. This is because when rolling occurs in the vehicle, the wheels of the vehicle are inclined with respect to the ground surface, and thus the deterioration of the ground-contact state can be judged on the basis of the degree of the inclination concerned. When it is judged that the ground-contact state of the wheel is not good (or fine), the roll rigidity of the vehicle is increased to suppress the roll angle occurring in the vehicle, whereby the ground-contact state of the vehicle is getting better and thus the safety of the vehicle when the vehicle is turning can be enhanced. For example, JP-A-2001-050973 discloses a method of estimating the behavior of a vehicle by measuring a roll angle or roll angular velocity. Furthermore, JP-A-2002-012141 discloses a general method concerning roll control of a vehicle.

However, in the method of estimating the ground-contact state of the wheel on the basis of the roll state of the vehicle, the ground-contact state of the vehicle is indirectly estimated, and thus it is difficult to judge the ground-contact state of the wheels with high precision.

SUMMARY OF THE INVENTION

An object of the present invention is to judge the ground-contact state of wheel with high precision.

Another object of the present invention is to perform motion state control of a vehicle with high precision.

In order to attain the above objects, according to a first aspect of the present invention, there is provided a wheel ground-contact state judging device comprising a detector for directly detecting, as a lateral force, a force acting in a direction perpendicular to a wheel center plane of a wheel, an acceleration sensor for detecting an acceleration in the lateral direction of a vehicle, a calculator for calculating a cornering force acting on the wheel on the basis of the acceleration in the lateral direction detected by the acceleration sensor, and a judging unit for comparing the detected lateral force with the calculated cornering force and judging the ground-contact state of the wheels.

Here, in the first aspect of the present invention, it is preferable that the detector detects the lateral force with respect to each of plural wheels provided to the vehicle as a detection target, the calculator calculates the total of the cornering forces acting on the respective wheels, and the judging unit comparing the total of the lateral forces detected for the respective wheels with the calculated total of the cornering forces and judging the ground-contact state with the whole of the plural wheels set as a judging unit.

Furthermore, in the first aspect of the present invention, it is preferable that a yaw rate sensor for detecting the yaw rate of the vehicle is further provided, the detector detects the lateral force with respect to each of plural wheels provided at the front and rear sides of the vehicle as a detection target, the calculator calculates the total of the cornering forces acting on the front wheels and the total of the cornering forces acting on the rear wheels on the basis of the detected yaw rate and the detected acceleration, and the judging unit compares the total of the lateral forces detected for the front wheels with the calculated total of the cornering forces acting on the front wheels to judge the ground-contact state of the front wheels and also compares the total of the lateral forces detected for the rear wheels with the calculated total of the cornering forces acting on the rear wheels to judge the ground-contact state of the rear wheels.

According to a second aspect of the present invention, there is provided a wheel ground-contact state judging device comprising a detector for directly detecting, as a vertical force, a force acting in a direction vertical to a wheel center plane of a wheel with respect to each of plural wheels provided to a vehicle as a detection target, and a judging unit for comparing the total of detected vertical forces detected for the respective wheels with a judgment value to judge the ground-contact state of the wheels.

Here, in the second aspect of the present invention, it is preferable that the judgment value is set on the basis of the total of the vertical forces detected for the respective wheels when the vehicle is at a standstill.

Furthermore, according to a third aspect of the present invention, there is provided a vehicle motion control device comprising the wheel ground-contact state judging device according to the first or second aspect of the present invention, and a controller for controlling the roll rigidity of the vehicle on the basis of the judgment result of the ground-contact state judging device.

Still furthermore, according to a fourth aspect of the present invention, there is provided a wheel ground-contact state judging method comprising a first step of directly detecting, as a lateral force, a force acting in a direction perpendicular to a wheel center plane of a wheel, a second step of detecting an acceleration in the lateral direction of a vehicle, a third step of calculating a cornering force acting on the wheels on the basis of the acceleration in the lateral direction thus detected, and a fourth step of comparing the detected lateral force with the calculated cornering force and judging the ground-contact state of the wheels.

According to the present invention, the forces acting on the wheels are directly detected by the detector. When the wheel ground-contact state is bad, the force detected by the detector and the actual force are not matched with each other in value. Therefore, the wheel ground-contact state can be judged by comparing both the values. Furthermore, in this embodiment, since the force acting on the wheel is directly detected, the wheel ground-contact state properly reflects the value concerned. Therefore, the judgment of the ground-contact state can be performed with higher precision.

DETAILED DESCRIPTION OF THE PREFERRED EMBODIMENTS

Preferred embodiments according to the present invention will be described hereunder with reference to the accompanying drawings.

First Embodiment

Figure 1:
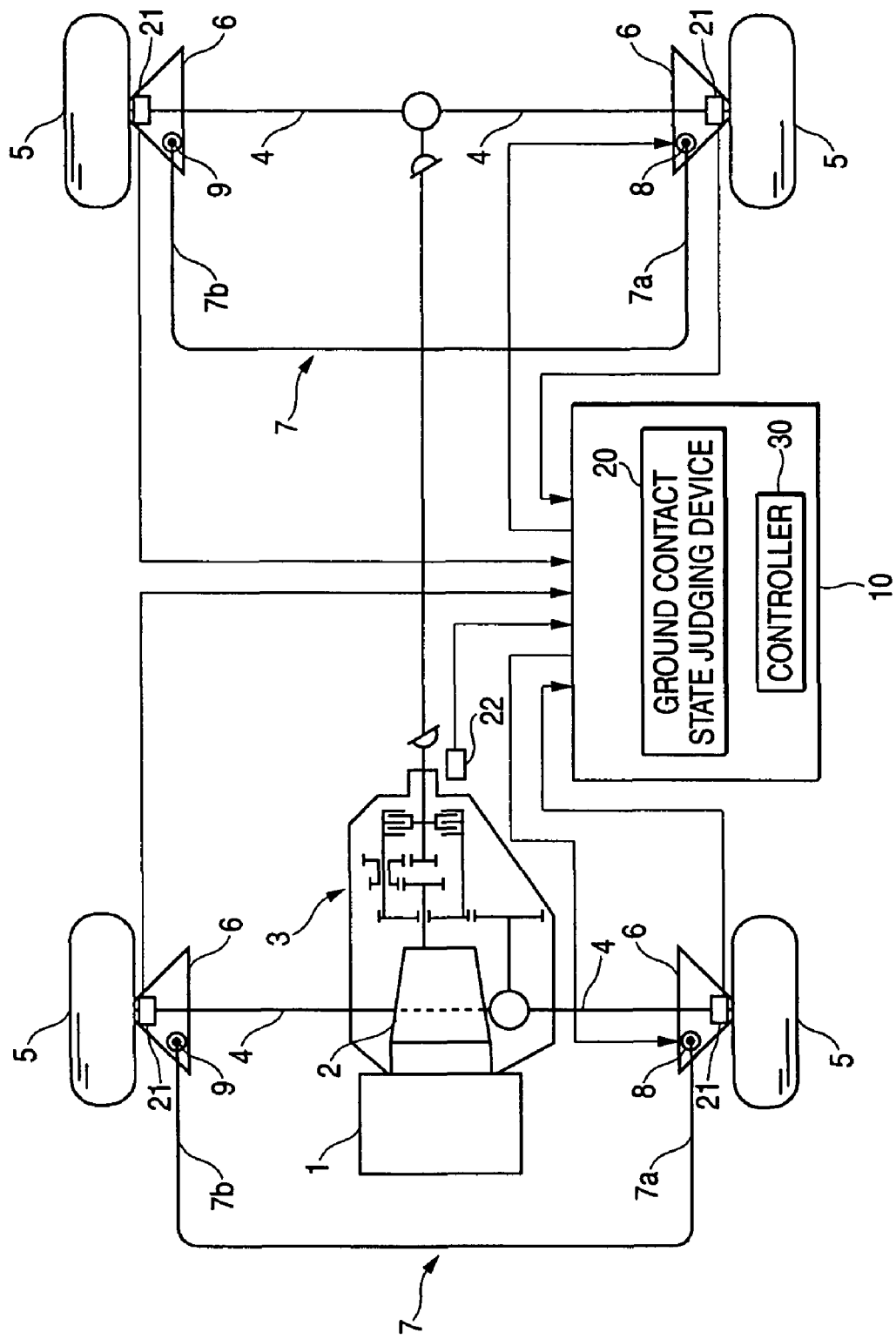
FIG. 1 is a diagram showing a vehicle to which a vehicle motion control device of an embodiment is applied.

FIG. 1 is a diagram showing a vehicle to which a vehicle motion control device of the first embodiment is applied. The vehicle is a four-wheel drive vehicle which is driven by front and rear wheels. The driving force transmitted from a crank shaft (not shown) of an engine 1 is transmitted through an automatic transmission 2 and a center differential device 3 to the driving shaft (axle) 4 of each of the front wheel side and the rear wheel side. When the driving force is transmitted to the axles 4, rotational torque is applied to each wheel 5, whereby a driving force occurs in each wheel 5.

The wheels 5 are suspended from the vehicle by suspension devices provided to the front and rear wheel sides. Each suspension device mainly comprises a pair of suspension arms 6, a pair of damper cylinders (not shown), and a pair of coil springs (not shown), and they suspend the right and left wheels 5 from the vehicle. Each suspension device is provided with a stabilizer 7 having a function of suppressing rolling of the vehicle. One arm 7a of the stabilizer 7 is connected through a connecting shaft 8 to the suspension arm 6 of one wheel (left wheel in this embodiment) 5. The other arm 7b of the stabilizer 7 is connected through an actuator 9 to the suspension arm 6 of the other wheel (right wheel in this embodiment) 5. The connecting shaft 8 is a shaft-type connecting member having a fixed length (height) in the vertical direction, and the actuator 9 is a connecting member whose height is freely adjustable. The actuator 9 mainly comprises a motor (not shown) and a ball screw, and the height thereof is variably set in accordance with the rotational amount of the motor.

At the normal condition which the vehicle is normally traveling, the actuator 9 is adjusted so that the height thereof corresponds to the height of the connecting shaft 8. In this case, the stabilizer 7 is kept in a horizontal position, and carries out the same function as a normal stabilizer. For example, at the right-turn time, the load imposed on the left wheel 5 corresponding to the outer wheel is increased, and the load imposed on the right wheel 5 corresponding to the inner wheel is reduced. That is, the left wheel side of the vehicle sinks, and the right wheel side of the vehicle is floated (that is, a roll angle occurs in the vehicle). In this case, the respective arms 7a,7b of the stabilizer 7 slack in opposite phase, and a torsional moment occurs in the stabilizer 7. The torsional moment induces a force for keeping the stabilizer 7 itself in a horizontal position, so that the rolling of the vehicle is suppressed. In addition to the normal function as described above, a torsional moment can be positively induced in the stabilizer 7 by controlling the actuator 9.

Figure 2:
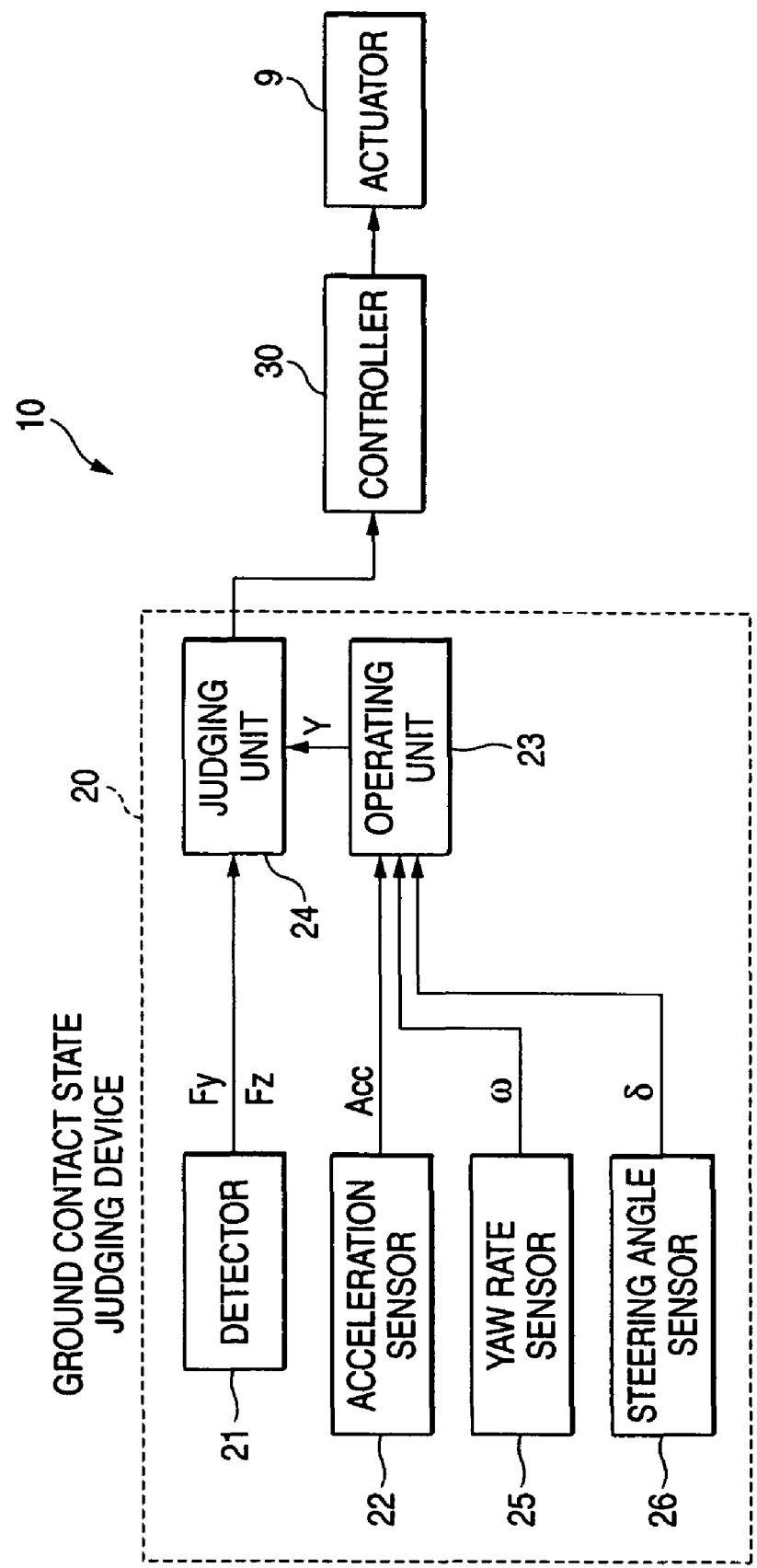
FIG. 2 is a block diagram showing the vehicle motion control device.

FIG. 2 is a block diagram showing a vehicle motion control device. The vehicle motion control device 10 is a device for enhancing the ground-contact state of the wheels 5 by suppressing the rolling of the vehicle, for example, and it mainly comprises a ground-contact state judging device 20 and a controller 30. A second embodiment described later will be also described with reference to the same figure, and thus FIG. 2 is illustrated as containing all the embodiments described below.

The ground-contact state judging device 20 judges whether the ground-contact state of the wheels 5 is good or not, and it comprises a detector 21, an acceleration sensor 22, a calculator 23 and a judging unit 24.

Figure 3:
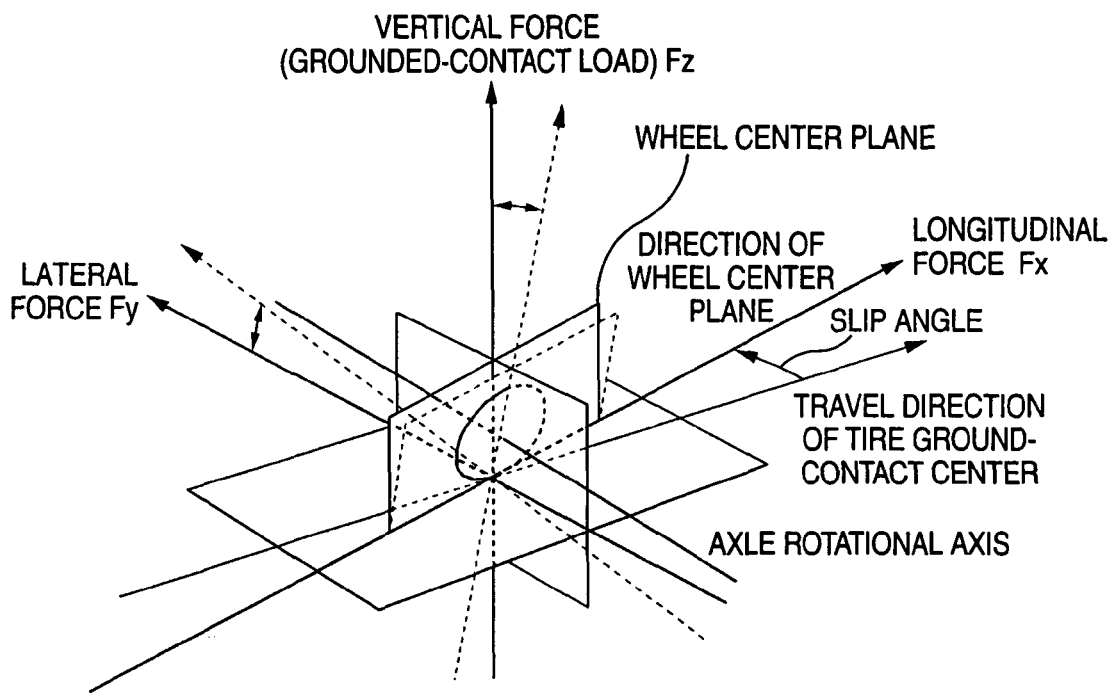
FIG. 3 is a diagram showing tire force.

FIG. 3 is a diagram showing tire force. The detector 21 is a sensor for detecting tire force acting on the wheel 5, and provided to each of the four wheels 5. For simplification of the drawings, only one block corresponding to the detector 21 is shown in FIG. 2. The tire force detected by the detector 21 contain a longitudinal force Fx, a lateral force Fy and a vertical force Fz. In this embodiment, the lateral force Fy and the vertical force Fz are important. The longitudinal force Fx is a component force occurring in a direction parallel to the wheel center plane out of friction forces occurring on the ground-contact surface of the wheel 5, and the lateral force Fy is a component force occurring in a direction perpendicular to the wheel center plane. The vertical force Fz is a force acting in the vertical direction, so-called a vertical load. Each detector 21 mainly comprises a strain gauge and a signal processing circuit for processing an electrical signal output from the strain gauge and generating the detection signal corresponding to the acting force. On the basis of the knowledge that the stress occurring in the axle 4 is proportional to the acting force, the strain gauge is embedded in the axle 4 and the acting force is directly detected. The lateral force Fy and the vertical force Fz associated with each wheel 5 thus detected are output to a judging unit 24 described later. The specific construction of the detector 21 is disclosed in JP-A-04-331336 and JP-A-10-318862, and if necessary, these publications should be referred to.

Figure 4A:
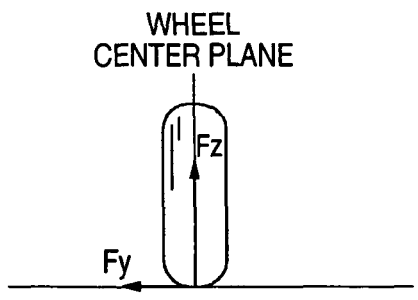
FIGS. 4A and 4B are diagrams showing a lateral force and an vertical force detected by a detector.
Figure 4B:
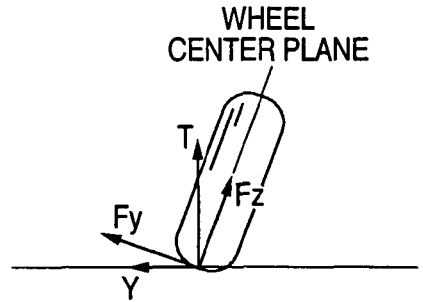

FIGS. 4A and 4B are diagrams showing the lateral force Fy and the vertical force Fz thus detected. The lateral force Fy and the vertical force Fz are defined as described above, however, the detector 21 actually detects the force acting in the direction perpendicular to the wheel center plane of the wheel (the plane defined by the wheel center line extending in the vertical direction and the wheel center line extending in the longitudinal direction) as the lateral force Fy. Here, the wheel center line is any line passing the center point of the wheel. Furthermore, the detector 21 detects the force acting in the extension direction of the wheel center line extending in the vertical direction as the vertical force Fz. Under the state that the wheel center plane is vertical, the lateral force Fy and the vertical force Fz detected by the detector 21 correspond to the forces as defined above (see solid lines with arrows in FIG. 3 and FIG. 4A). However, when the vehicle is turning, the wheels 5 are inclined in connection with the rolling of the vehicle and the ground-contact state of the wheels is bad, the forces Fy, Fz thus detected are not coincident with the defined values (see dashed lines with arrows in FIG. 3 and FIG. 4B). Specifically, the lateral force Fy detected is larger than the lateral force Y on the definition (hereinafter referred to as "actual lateral force"), and the vertical force Fz detected is smaller than the vertical force T on the definition (hereinafter referred to as "actual vertical force").

The acceleration sensor 22 is a well-known acceleration sensor for detecting an acceleration in the lateral direction of the vehicle (hereinafter referred to as "lateral acceleration") Acc. The lateral acceleration Acc detected is output to the calculator 23. The calculator 23 calculates a cornering force Y acting on the wheel 5 on the basis of the detected lateral acceleration Acc. The cornering force Y is a component force acting perpendicular to the travel direction of the wheel 5 out of the friction forces occurring on the ground-contact face of the wheel when the wheel 5 turns at a slip angle. However, in this embodiment, the force which acts in the perpendicular direction to the vehicle in consideration of inclination of the wheel 5, that is, the actual lateral force Y is set as the cornering force. When the cornering force Y is calculated, the calculation result is output to the judging unit 24.

The judging unit 24 compares the lateral force Fy of each wheel 5 with the cornering force Y to judge the ground-contact state of the wheel 5. In this embodiment, the judging unit 24 judges "good" when the ground-contact state of the wheel 5 is good, and judges "bad" in the other cases, that is, when the ground-contact state of the wheel 5 is bad.

The controller 30 controls the roll rigidity of the vehicle on the basis of the judgment result output from the ground-contact state judging device 20. Specifically, the controller 30 controls the actuator 9 of the stabilizer 7 to adjust the roll rigidity of the vehicle. Accordingly, the rolling of the vehicle is suppressed, so that the ground-contact state of the wheel 5 is getting better.

Figure 5:
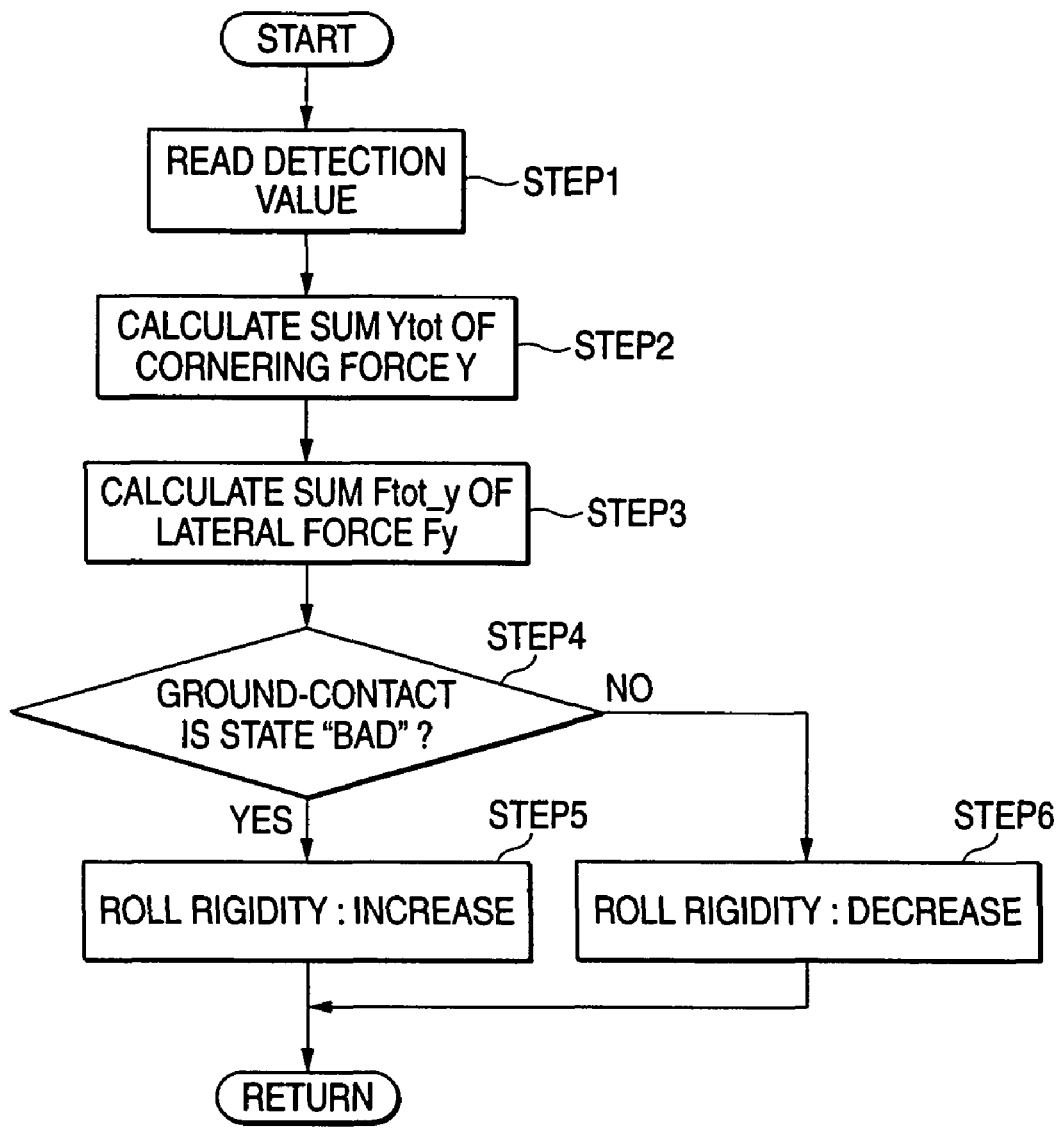
FIG. 5 is a flowchart showing a vehicle motion control routine according to an embodiment.

FIG. 5 is a flowchart showing the vehicle motion control routine of the embodiment. In step 1, various kinds of detection values are first read in. The detection values thus read in step 1 contain the lateral acceleration Acc and the lateral force Fy of each wheel 5. When the lateral force Fy and the cornering force Y are discriminated every wheel, the left front wheel, the right front wheel, the left rear wheel and the right rear wheel are discriminated from one another by suffixes fl, fr, rl, rr. For example, Ffl_y represents the lateral force Fy acting on the left front wheel 5.

In step 2, the cornering force Y of each wheel 5 is calculated. In this embodiment, the cornering force Y is calculated on the basis of the detection value of the acceleration sensor 22, and thus the cornering forces Y of the respective wheels 5 are calculated as the total Ytot of these values (Ytot=Yfl+Yfr+Yrl+Yrr). The total Ytot of the cornering forces Y can be uniquely calculated by multiplying the detected lateral acceleration Acc by the mass of the vehicle. Furthermore, the total Ftot_y of the lateral forces Fy with respect to the four wheels is calculated on the basis of the lateral forces Ffl_y to Frr_y of the respective wheels 5 thus detected (step 3).

In step 4, it is judged whether the ground-contact state of the wheel 5 is "bad", that is, the wheel rolls. Normally, under the state that the wheel 5 comes into proper contact with the road surface, the following relationship is established between the lateral forces Ffl_y, Ffr_y of the front wheels 5 corresponding to the steering wheels and the cornering forces Yfl, Yfr of the front wheels 5 (equation 1). Here, the steering angle of the front wheel 5 is represented by δ.

$$Yfl = Ffl\_y \cdot \cos\delta$$

$$Yfr = Ffr\_y \cdot \cos\delta \qquad \text{[Equation 1]}$$

As described above, when the vehicle rolls, the lateral force Fy is larger than the actual lateral force Y on definition, and this tendency is more remarkable as the roll angle occurring in the vehicle is larger, that is, the ground-contact state of the wheel 5 is worse. Therefore, on the assumption of the equation 1, the following equation 2 is satisfied between the total Ftot_y of the lateral forces and the total Ytot of the cornering forces.

$$Ytot = Yfl + Yfr + Yrl + Yrr \qquad \text{[Equation 2]}$$
$$\leq Ftot\_y'$$
$$= (Ffl\_y + Ffr\_y)\cos\delta + Frl\_y + Frr\_y$$

In the normal travel, the steering angle δ is a small value, and thus the cosine value thereof can be regarded as 1. In this case, the right side (Ftot_y') based on inequality sign can be substantially replaced by the total Ftot_y of the lateral forces. Therefore, in step 4, the total Ftot_y of the lateral forces is compared with the total Ytot of the cornering forces calculated to judge the ground-contact state with the whole of the wheels set as a judging unit. Specifically, it is judged whether the total Ytot of the cornering forces is sufficiently smaller than the total Ftot_y of the lateral forces, that is, it is sufficiently smaller than the multiplication of the total Ftot_y of the lateral forces and a predetermined constant K (0<K<1, for example, 0.9) (Ytot<K·Ftot_y). When a positive judgment is made in step 4, that is, the ground-contact state of the wheel 5 is "bad" (Ytot<K·Ftot_y), the processing goes to step 5. On the other hand, when a negative judgment is made in step 4, that is, when the ground-contact state of the wheel 5 is "good", (Ytot≧K·Ftot_y), and the processing goes to step 6.

In step 5, the actuators 9 of the front and rear wheel sides are controlled so as to increase the roll rigidity of the vehicle. Specifically, when the vehicle turns to the right, that is, the vehicle at the left wheel side sinks while the vehicle at the right wheel side is floated, the controller 30 reduces the actuators 9 of the front and rear wheel sides by a predetermined amount. In this case, since the actuators 9 are secured to the right wheel side, and thus the repulsive force to the left wheel (that is, the wheel at the connecting shaft 8 side) side is increased by the torsional moment. Accordingly, the sinking at the left side of the vehicle is suppressed, so that the ground-contact state of the wheel 5 gets better. On the other hand, when the vehicle turns to the left, the controller 30 controls the actuators 9 in the opposite manner as described above. In this case, the sinking at the right side of the vehicle is suppressed, so that the ground-contact state of the wheel 5 gets better.

In step 6, the actuators 9 of the front and rear wheel sides are controlled so as to reduce the roll rigidity of the vehicle. Specifically, the controller 30 expands/contracts the height of the actuators 9 at the front and rear wheel sides by a predetermined amount so that the height thereof is nearer to the height of the connecting shaft 8 than the present height thereof. Accordingly, even when the roll rigidity of the vehicle is excessively increased at the turn time or even when the travel state is restored to the normal travel state, the ground-contact state of the wheel 5 gets better. When the height of the actuator 9 is coincident with the height of the connecting shaft 8, it is impossible to further reduce the roll rigidity, and thus the control of the actuator 9 is not further executed in step 6.

As described above, according to this embodiment, the force acting in the perpendicular direction to the wheel center plane is directly detected as the lateral force by the detector 21. When the ground-contact state of the wheel 5 is bad, the lateral force Fy detected by the detector 21 is not matched with the actual lateral force Y in value. Therefore, by comparing both the values, the ground-contact state of the wheel 5 can be judged. Furthermore, in this embodiment, since the lateral force Fy is directly detected, the ground-contact state of the wheel 5 properly reflects the value concerned, so that the judgment of the ground-contact state can be performed with higher precision. Furthermore, the roll angle occurring in the vehicle is suppressed by positively adjusting the roll rigidity of the vehicle on the basis of the judgment result of the ground-contact state judgment. Accordingly, the ground-contact state of the wheel 5 can be kept good, and the safety of the vehicle when the vehicle turns can be enhanced.

Second Embodiment

In the first embodiment, the contact-ground state is judged in terms of the whole of the wheels 5 at the front, rear, right and left sides, that is, the overall wheel. According to this embodiment, the whole of the wheels is divided into the front wheel side and the rear wheel side, and the ground-contact state is judged with respect to each of the front and rear wheel sides. The overall system construction and the basic portion concerning the control procedure are the same as the first embodiment, and thus the description thereof is omitted (the same is applied to an embodiment described later). The system construction of this embodiment is different from that of the first embodiment in that a yaw rate sensor 25 is further provided.

The yaw rate sensor 25 is a well-known sensor for detecting the yaw rate ω of the vehicle, and the detection signal of the yaw rate sensor 25 is output to the calculator 23. The calculator 23 calculates the total Yf_tot of the cornering forces of the front wheels 5 and the total Yr_tot of the cornering forces of the rear wheels 5 on the basis of the detected yaw rate ω and the detected lateral acceleration Acc. Specifically, a yaw angular acceleration dω/dt corresponding to a variation per unit time of the yaw rate ω is first calculated. On the basis of the yaw angular acceleration dω/dt thus calculated and the lateral acceleration Acc thus detected, the total Yf_tot of the cornering forces of the front wheel 5 and the total Yr_tot of the cornering forces of the rear wheels 5 are calculated. The cornering forces Yf_tot, Yr_tot are uniquely calculated on the basis of the following equations.

$$Yf\_tot = \frac{lr \cdot m \cdot Acc + Iz \cdot (d\omega/dt)}{lf + lr}$$ [Equation 3]

$$Yr\_tot = \frac{lf \cdot m \cdot Acc - Iz \cdot (d\omega/dt)}{lf + lr}$$

In the above equations, lf represents the distance between the center of gravity of the vehicle and the front wheel 5, and lr represents the distance between the center of gravity of the vehicle and the rear wheel 5. Iz represents the moment of inertia of the vehicle around the vertical axis.

When the vehicle is turning, the following relationship is satisfied between the total of the lateral forces Ffl_y, Ffr_y associated with the front wheels 5 and the total Yf_tot of the cornering forces associated with the front wheels 5. The following relationship is satisfied between the total of the lateral forces frl_y, Frr_y associated with the rear wheels 5 and the total Yr_tot of the cornering forces associated with the front wheels 5.

$$Yf\_tot \leq (Ffl\_y + Ffr\_y)\cos\delta$$

$$Yr\_tot \leq (Frl\_y + Frr\_y)$$ [Equation 4]

Therefore, as in the case of the first embodiment, the total of the lateral forces Ffl_y, Ffr_y associated with the front wheels 5 is compared with the total Yf_tot of the cornering forces associated with the front wheels 5 to judge whether the ground-contact state of the front wheels 5 is good or not. Furthermore, the total of the lateral forces Frl_y, Frr_y associated with the rear wheels 5 is compared with the total Yr_tot of the cornering forces associated with the rear wheels 5 to judge whether the ground-contact state of the rear wheels 5 is good or not. When it is judged through this comparison that the ground-contact state of the wheel 5 is bad, on the basis of the judgment result of the front wheels 5 and the judgment result of the rear wheels 5, the ground contact performance of the wheels can be enhanced independently between the front and rear wheels 5.

As described above, according to this embodiment, the same effect as the first embodiment is achieved, and also the ground-contact state can be judged independently for each of the front wheels 5 and the rear wheels 5 with the use of the value detected by the yaw rate sensor. Therefore, even when the ground-contact state is judged as being good as the whole wheels, badness (defect) of the ground-contact state which may occur at the front wheels 5 or rear wheels 5 can be properly judged. Furthermore, on the basis of the individual judgment result, the ground-contact performance of the wheels can be enhanced independently for each of the front wheel 5 and the rear wheel 5, so that the ground-contact state of the wheels 5 can be kept better.

Third Embodiment

In the above embodiments, the ground-contact state is judged by comparing the lateral force Fy and the cornering force Y. However according to this embodiment, the ground-contact state as the overall wheels is judged on the basis of the vertical force Fz. That is, it is necessary to compare the vertical force Fz as a detection value with the actual vertical force T to judge the ground-contact state, however, it is difficult to detect the actual vertical force T. Therefore, when the judgment based on the vertical force is made, for example, the total of the vertical forces Fz of the respective wheels 5 when the vehicle is at a standstill is detected as a reference value Ttot in advance. Then, it is judged whether the total Ftot_z of the vertical forces detected at some timing is sufficiently smaller than the reference value Ttot, that is, smaller than the multiplication of the reference value Ttot and a predetermined constant K (0<K<1, for example, 0.9) (Ftot_y<K·Ttot). Through this comparison, it is judged that the ground-contact state of the wheels 5 is bad (Ftot_z<K·Ttot), it is attempted to enhance the ground-contact performance of the front wheels 5 and the rear wheels 5 as in the case of the first embodiment.

As described above, according to this embodiment, the vertical force Fz acting in the vertical direction of the wheel center plane is directly detected by the detector 21. When the ground-contact state of the wheels 5 is bad, the vertical force Fz detected by the detector 21 and the actual vertical force T are not matched with each other in value. Therefore, the same effect as the first embodiment described above is achieved by comparing both the values. In this embodiment using the vertical force Fz, a judgment value (fixed value) may be set through experiments and simulations in advance, and the detected vertical force Fz may be compared with the judgment value to judge whether the ground-contact state of the wheels 5 is good or not.

In the above-described embodiments, the ground-contact state of the wheels 5 is judged by two types "good" and "bad". However, the present invention is not limited to this mode, and any style may be used for the judgment. For example, the degree of the ground-contact state may be judged in accordance with the degree of the difference between the detection value and the acting force on the definition, for example, like "good", "normal" and "bad".

Furthermore, in the above embodiments, the control of the stabilizer 7 is described as a method of directly enhancing the ground-contact performance of tires, however, the present invention is not limited to these embodiments. For example, a method of controlling the suspension and a method of controlling a camber angle may be considered as a method of enhancing the ground-contact performance. The suspension control is disclosed in JP-A-2002-347424, and if necessary, this publication should be referred to. Furthermore, the camber angle control is disclosed in JP-A-10-264636, and if necessary, this publication should be referred to.

Still furthermore, in the respective embodiments, the processing is carried out while the steering angle is regarded as "0". However, a steering angle sensor 26 for detecting the steering angle of the front wheels 5 may be provided so that the ground-contact state judgment is carried out on the basis of this value. In this case, there is an advantage that the ground-contact state can be judged with higher precision. However, in the respective embodiments described above, it is unnecessary to provide the steering angle sensor 26, and thus there is an advantage that the construction of the ground-contact state judging device 20 can be simplified.

In this embodiment, the detector 21 is designed so as to detect the tire force acting in the three directions. However, the present invention is not limited to this embodiment, and it may be sufficient to detect only an acting force acting in a direction of a necessary component force. Furthermore, a six-component-force meter for detecting not only component forces in the three directions, but also moments around these three directions may be provided. Even this construction can detect at least necessary tire force, and thus no problem is induced by this construction. A method of detecting the six component forces acting on the wheels 5 is disclosed in JP-A-2002-039744 and JP-A-2002-022579, and if necessary, these publications should be referred to.

Furthermore, In this embodiment, the detector 21 is embedded in the axle 4. However, the present invention is not limited to this mode, and various modifications may be made. From the viewpoint that the tire force are detected, the detector 21 may be provided with a member for holding the wheel 5, for example, a hub, a hub carrier or the like. A method of providing the detector 21 to the hub is disclosed in JP-A-2003-104139, and if necessary, this publication should be referred to.

In the above embodiments, when the detector 21 breaks down, the ground-contact state judgment is not carried out, and the stabilizer is controlled so as to be proportional to the lateral acceleration Acc, thereby directly enhancing the ground-contact performance of the tires. Likewise, the suspension or the camber angle may be controlled so as to be proportional to the lateral acceleration Acc, thereby directly enhancing the ground-contact performance of the tires. As described above, when the acceleration Acc in the lateral direction acts on the vehicle, it is uniquely judged that the ground-contact state of the wheels 5 is bad, and the control is executed, whereby the ground-contact state of the tires can be made good.

What is claimed is:

1. A wheel ground-contact state judging device comprising:
    a detector for directly detecting, as a lateral force, a force acting on a wheel in a direction perpendicular to a wheel center plane of the wheel;
    an acceleration sensor for detecting an acceleration in the lateral direction of a vehicle;
    a calculator for calculating a cornering force acting on the wheel on the basis of the acceleration in the lateral direction detected by the acceleration sensor; and
    a judging unit for judging the ground-contact state of the wheel on the basis of comparison between the detected lateral force and the calculated cornering force, wherein said judging unit determines an existence of a bad ground-contact state of the wheel upon a criteria being established that the calculated cornering force is smaller than the detected lateral force by a predetermined amount.

2. The wheel ground-contact state judging device according to claim 1, wherein the detector detects the lateral force with respect to each of plural wheels provided to the vehicle as a detection target, the calculator calculates a total of the cornering forces acting on the respective wheels, and the judging unit judges the ground-contact state with the whole of the plural wheels set as a judging unit on the basis of a comparison between a total of the lateral forces (Ftot_y) and the total of the cornering forces (Ytot), and wherein the judging unit determines the existence of said criteria when Ytot<K·Ftot_y with K satisfying (0<K<1).

3. The wheel ground-contact state judging device according to claim 1, further comprising
    a yaw rate sensor for detecting a yaw rate of the vehicle is further provided,
    wherein the detector detects the lateral force with respect to each of plural wheels provided at the front and rear sides of the vehicle as a detection target, the calculator calculates a total of the cornering forces acting on the front wheels and a total of the cornering forces acting on the rear wheels on the basis of the detected yaw rate and the detected acceleration, and the judging unit judges the ground-contact state of the front wheels on the basis of comparison between the total of the lateral forces detected for the front wheels and the total of the cornering forces acting on the front wheels and also judges the ground-contact state of the rear wheels on the basis of comparison between the total of the lateral forces detected for the rear wheels and the total of the cornering forces acting on the rear wheels.

4. The wheel ground-contact state judging device according to claim 1, further comprising:
    a controller for controlling the roll rigidity of the vehicle on the basis of a judgment result of said judging device.

5. A wheel ground-contact state judging method comprising:
    a first step of directly detecting, as a lateral force, a force acting on a wheel in a direction perpendicular to a wheel center plane of the wheel;
    a second step of detecting an acceleration in the lateral direction of a vehicle;
    a third step of calculating a cornering force acting on the wheel on the basis of the acceleration in the lateral direction thus detected; and
    a fourth step of judging the ground-contact state of the wheel on the basis of a comparison between the detected lateral force and the calculated cornering force, wherein a judging unit determines an existence of a bad ground-contact state of the wheel upon a criteria being established that the calculated cornering force is smaller than the detected lateral force by a predetermined amount.

6. The wheel ground-contact state judging method according to claim 5, wherein the second step of detecting the acceleration in the lateral direction includes detecting the lateral forces with respect to each of a plurality of wheels provided to the vehicle, the third step of calculating the cornering force includes calculating a total of the cornering forces acting on the respective plurality of wheels on the basis of the acceleration in the lateral direction, and the fourth step of judging the ground-contact state includes judging the ground-contact state with respect to the whole of plurality of wheels set as a judging unit on the basis of comparison between a total of the detected lateral forces (Ftot_y) and the total of the cornering forces (Ytot), and wherein the judging unit determines the existence of said criteria when Ytot<K·Ftot_y with K satisfying (0<K<1).

7. The wheel ground-contact state judging method according to claim 5, further comprising:
a fifth step of detecting the yaw rate of the vehicle, and wherein the second step of detecting the acceleration in the lateral direction includes detecting the lateral force with respect to each of a plurality of wheels provided at the front and rear sides of the vehicle as a detection target, the third step of calculating the cornering force includes calculating a total of the cornering forces acting on the front wheels and the total of the cornering forces acting on the rear wheels on the basis of the detected yaw rate and the detected acceleration, and the fourth step of judging the ground-contact state includes judging the ground contact state of the front wheels on the basis of a comparison between the total of the lateral forces detected for the front wheels and the total of the cornering forces acting on the front wheels and also judging the ground-contact state of the rear wheels on the basis of a comparison between the total of the lateral forces detected for the rear wheels and the total of the cornering forces acting on the rear wheels.

8. The wheel ground-contact state judging method according to claim 5, further comprising:
a sixth step of controlling roll rigidity of the vehicle on the basis of a result in the fourth step.

9. The wheel ground-contact state judging method according to claim 5 wherein the first step of directly detecting the force on the wheel is based on a detector that is provided to the wheel or a wheel axle for the wheel.

10. The wheel ground-contact state judging device according to claim 1, wherein the detector is provided to the wheel or a wheel axle for that wheel.

* * * * *